United States Patent
Dantkale et al.

(10) Patent No.: US 10,210,013 B1
(45) Date of Patent: Feb. 19, 2019

(54) SYSTEMS AND METHODS FOR MAKING SNAPSHOTS AVAILABLE

(71) Applicant: Veritas Technologies LLC, Mountain View, CA (US)

(72) Inventors: Suhas Dantkale, Sunnyvale, CA (US); Rakesh Ranjan, Cupertino, CA (US); Vivek Agrawal, Cupertino, CA (US)

(73) Assignee: Veritas Technologies LLC, Mountain View, CA (US)

( * ) Notice: Subject to any disclaimer, the term of this patent is extended or adjusted under 35 U.S.C. 154(b) by 118 days.

(21) Appl. No.: 15/199,002

(22) Filed: Jun. 30, 2016

(51) Int. Cl.
  *G06F 9/46* (2006.01)
  *G06F 9/455* (2018.01)
  *G06F 17/30* (2006.01)

(52) U.S. Cl.
  CPC .... *G06F 9/45558* (2013.01); *G06F 17/30088* (2013.01); *G06F 2009/45562* (2013.01); *G06F 2009/45579* (2013.01); *G06F 2009/45583* (2013.01)

(58) Field of Classification Search
  CPC .......... G06F 9/45558; G06F 17/30088; G06F 2009/45562; G06F 2009/45579; G06F 2009/45583
  See application file for complete search history.

(56) References Cited

U.S. PATENT DOCUMENTS

| | | |
|---|---|---|
| 6,647,473 B1 | 11/2003 | Golds |
| 7,636,814 B1 | 12/2009 | Karr et al. |
| 8,001,345 B2 * | 8/2011 | Wayda ................ G06F 11/1435 711/162 |
| 8,082,230 B1 * | 12/2011 | Root ................ G06F 17/30088 707/661 |
| 8,135,930 B1 * | 3/2012 | Mattox ............... G06F 9/45558 711/100 |
| 8,612,681 B2 | 12/2013 | Saito et al. |
| 9,311,242 B1 | 4/2016 | Banerjee |
| 9,367,457 B1 | 6/2016 | Pendharkar |
| 2003/0212865 A1 | 11/2003 | Hicken et al. |

(Continued)

OTHER PUBLICATIONS

Direct-attached storage, https://en.wikipedia.org/wiki/Direct-attached_storage, as accessed Jun. 7, 2016, Wikipedia, (Mar. 5, 2008).

(Continued)

*Primary Examiner* — Camquy Truong
(74) *Attorney, Agent, or Firm* — FisherBroyles LLP (57) ABSTRACT

The disclosed computer-implemented method for making snapshots available may include (i) identifying a writeback log that records input/output operations of a compute node within a high-availability environment, (ii) placing, in the writeback log, a marker that indicates a start of a snapshot to be stored on a data node, (iii) marking, after placing the marker and before all data within the snapshot has been transferred to the data node, the snapshot as available, (iv) receiving, from an additional compute node, a request to read from the snapshot, and (v) sending, from the compute node to the additional compute node, metadata indicating which portion of data from the snapshot is stored on the data node and which portion of the data from the snapshot is not stored on the data node but is stored in the writeback log. Various other methods, systems, and computer-readable media are also disclosed.

17 Claims, 5 Drawing Sheets

(56) References Cited

U.S. PATENT DOCUMENTS

| | | | |
|---|---|---|---|
| 2004/0010663 A1* | 1/2004 | Prabhu | G06F 12/0804 |
| | | | 711/143 |
| 2006/0200638 A1 | 9/2006 | Galipeau et al. | |
| 2006/0265568 A1 | 11/2006 | Burton | |
| 2007/0067583 A1 | 3/2007 | Zohar | |
| 2010/0070678 A1* | 3/2010 | Zhang | G06F 9/461 |
| | | | 711/6 |
| 2010/0077165 A1 | 3/2010 | Lu et al. | |
| 2013/0339569 A1 | 12/2013 | Yochai et al. | |
| 2014/0059298 A1 | 2/2014 | Olin et al. | |
| 2016/0292074 A1* | 10/2016 | Awasthi | G06F 13/4027 |

OTHER PUBLICATIONS

Extent (file systems), https://en.wikipedia.org/wiki/Extent_(file_systems), as accessed Jun. 7, 2016, Wikipedia, (Nov. 15, 2007).

Anindya Banerjee; Systems and Methods for Enabling Write-Back-Cache Aware Snapshot Creation; U.S. Appl. No. 13/743,904, filed Jan. 17, 2013.

Niranjan Pendharkar; Systems and Methods for Enabling Write-Back Caching and Replication at Different Abstraction Layers; U.S. Appl. No. 13/720,871; filed Dec. 19, 2012.

* cited by examiner

SYSTEMS AND METHODS FOR MAKING SNAPSHOTS AVAILABLE

BACKGROUND

In the past, large-scale computing projects were limited to individuals and enterprises that owned large physical data centers with towering racks of computers. Now, distributed computing allows anyone with the resources to buy server space to run as many instances of their preferred computing device as desired, often in the form of virtual machines hosted on compute nodes. In many cases, compute nodes may be part of high-availability environments that are designed to maintain as much uptime as possible. High-availability environments may be important for a variety of use cases, such as financial services that cannot afford to miss even thirty seconds of stock trading or customer-facing applications that will trigger dozens or hundreds of customer support calls if the system goes down. One way of helping ensure that a high-availability environment suffers minimal downtime is to create as much redundancy as possible. Every virtual machine may have snapshots taken on a regular basis that can be used to create a duplicate virtual machine if necessary.

Unfortunately, traditional systems for making snapshots available may not be instantaneous. Snapshot data may be stored on a data node, separate from the compute node that hosts the virtual machine being snapshotted, meaning that network latency can slow down the availability of a snapshot. The instant disclosure, therefore, identifies and addresses a need for systems and methods for making snapshots available.

SUMMARY

As will be described in greater detail below, the instant disclosure describes various systems and methods for making snapshots available by enabling other nodes to request snapshot data directly from the writeback log on the compute node that originated the snapshot.

In one example, a computer-implemented method for making snapshots available may include (i) identifying a writeback log that records input/output operations of a compute node within a high-availability environment, (ii) placing, in the writeback log, a marker that indicates the start of a snapshot to be stored on a data node, (iii) marking, after placing the marker and before all data within the snapshot has been transferred to the data node, the snapshot as available to be read by an additional compute node in the high-availability environment, (iv) receiving, from the additional compute node, a request to read from the snapshot, and (v) sending, from the compute node to the additional compute node, metadata indicating which portion of data from the snapshot is stored on the data node and which portion of the data from the snapshot is not stored on the data node but is stored in the writeback log.

In one embodiment, the computer-implemented method may further include receiving, at the compute node, a read request for data within the portion of the data from the snapshot that is not stored on the data node but is stored in the writeback log and sending, from the compute node to the additional compute node, the data requested by the read request that is stored in the writeback log. Additionally or alternatively, the computer-implemented method may further include transferring, from the compute node to the additional compute node, the portion of the data from the snapshot that is not stored on the data node but is stored in the writeback log.

In one embodiment, the computer-implemented method may further include (i) issuing, by a controller node, a virtual disk creation command to create a virtual disk hosted by the additional compute node, (ii) receiving, by the controller node, a unique identifier of the snapshot, an identifier of the compute node, and an identifier of the additional compute node, (iii) requesting, by the additional compute node, the metadata from the compute node, (iv) receiving, by the additional compute node, the metadata from the compute node, (v) updating, by the additional compute node, an extent map for the virtual disk that, for each portion of data from the snapshot, stores a location of the portion of data, and (vi) marking, in response to the additional compute node updating the extent map, the virtual disk creation command as completed. In one embodiment, the additional compute node may include the compute node.

In one embodiment, the computer-implemented method may further include detecting that all of the data from the snapshot is now stored on the data node and deleting the writeback log. In some examples, the snapshot may include a snapshot of a virtual machine.

In one embodiment, a system for implementing the above-described method may include (i) an identification module, stored in memory, that identifies a writeback log that records input/output operations of a compute node within a high-availability environment, (ii) a placing module, stored in memory, that places, in the writeback log, a marker that indicates the start of a snapshot to be stored on a data node, (iii) a marking module, stored in memory, that marks, after placing the marker and before all data within the snapshot has been transferred to the data node, the snapshot as available to be read by an additional compute node in the high-availability environment, (iv) a receiving module, stored in memory, that receives, from the additional compute node, a request to read from the snapshot, (v) a sending module, stored in memory, that sends, from the compute node to the additional compute node, metadata indicating which portion of data from the snapshot is stored on the data node and which portion of the data from the snapshot is not stored on the data node but is stored in the writeback log, and (vi) at least one physical processor configured to execute the identification module, the placing module, the marking module, the receiving module, and the sending module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a writeback log that records input/output operations of a compute node within a high-availability environment, (ii) place, in the writeback log, a marker that indicates the start of a snapshot to be stored on a data node, (iii) mark, after placing the marker and before all data within the snapshot has been transferred to the data node, the snapshot as available to be read by an additional compute node in the high-availability environment, (iv) receive, from the additional compute node, a request to read from the snapshot, and (v) send, from the compute node to the additional compute node, metadata indicating which portion of data from the snapshot is stored on the data node and which portion of the data from the snapshot is not stored on the data node but is stored in the writeback log.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for making snapshots available. As will be explained in greater detail below, by enabling other nodes to read snapshot data directly from a writeback log rather than waiting until all of the snapshot data has been transferred to a data node before marking the snapshot as available, the systems and methods described herein may make snapshots available instantaneously, increasing the speed at which nodes in high-availability clusters can create new virtual disks from snapshots. Moreover, the systems and methods described herein may improve the functioning and/or performance of a high-availability environment (i.e., a set of nodes of various types hosted on servers) by improving the uptime of the high-availability environment due to enabling speedier duplication of data.

Figure 1:
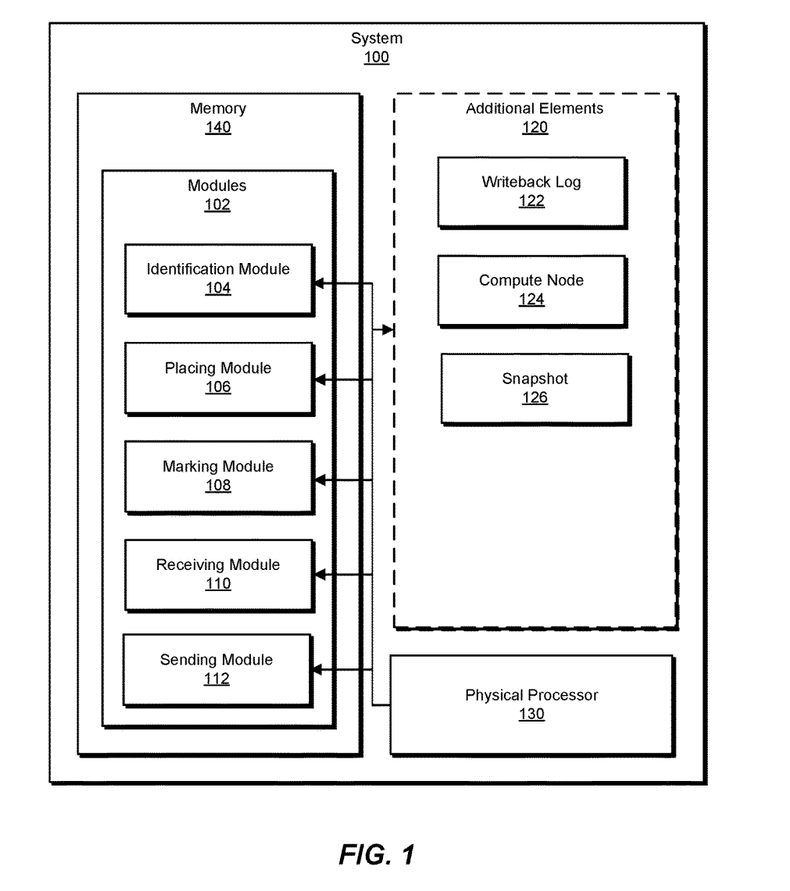
FIG. 1 is a block diagram of an example system for making snapshots available.
Figure 2:
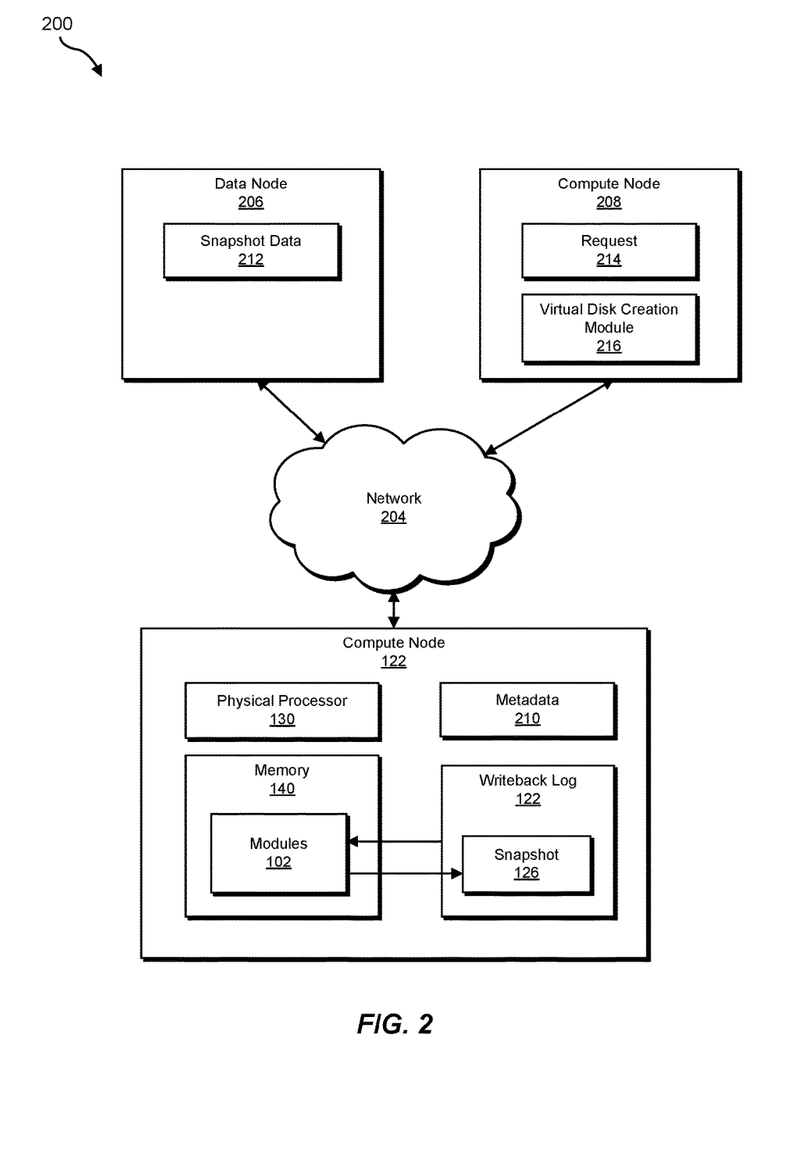
FIG. 2 is a block diagram of an additional example system for making snapshots available.
Figure 3:
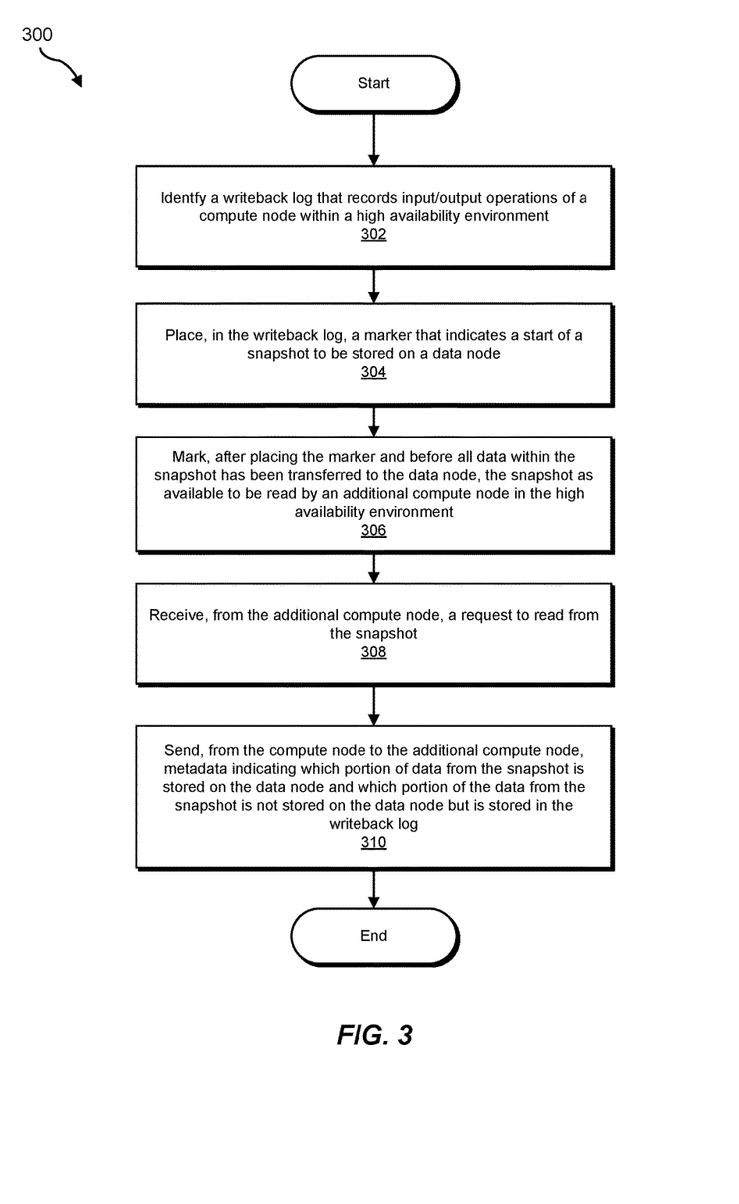
FIG. 3 is a flow diagram of an example method for making snapshots available.
Figure 4:
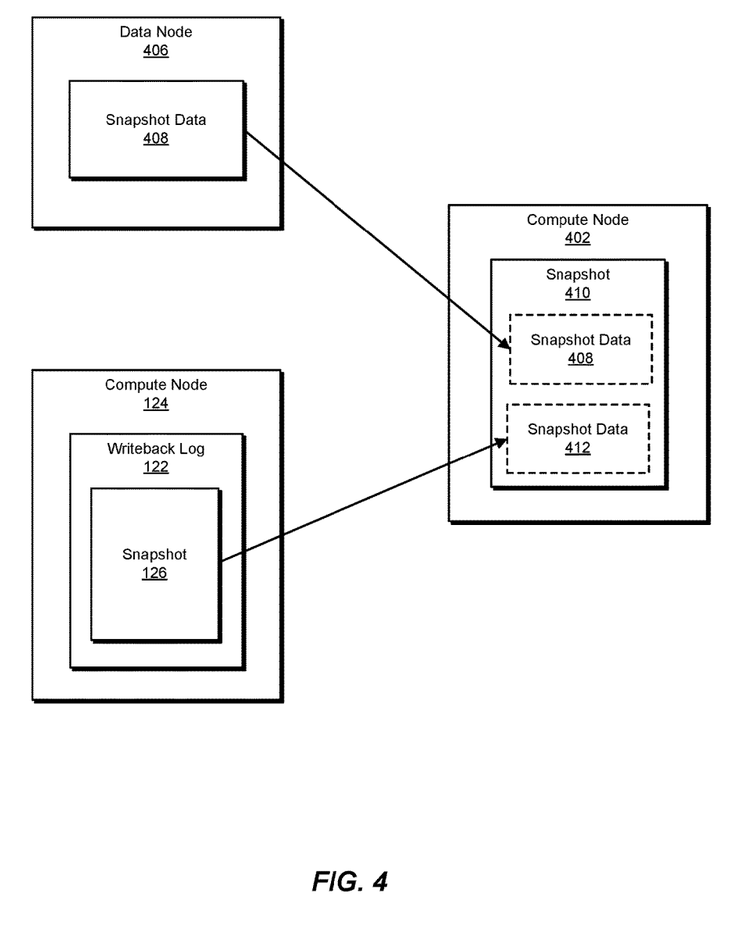
FIG. 4 is a block diagram of an additional example system for making snapshots available.

The following will provide, with reference to FIGS. 1, 2, and 4, detailed descriptions of example systems for making snapshots available. Detailed descriptions of corresponding computer-implemented methods will also be provided in connection with FIGS. 3 and 5.

FIG. 1 is a block diagram of example system 100 for making snapshots available. As illustrated in this figure, example system 100 may include one or more modules 102 for performing one or more tasks. For example, and as will be explained in greater detail below, example system 100 may include an identification module 104 that identifies a writeback log that records input/output operations of a compute node within a high-availability environment. Example system 100 may additionally include a placing module 106 that places, in the writeback log, a marker that indicates the start of a snapshot to be stored on a data node. Example system 100 may also include a marking module 108 that marks, after placing the marker and before all data within the snapshot has been transferred to the data node, the snapshot as available to be read by an additional compute node in the high-availability environment. Example system 100 may additionally include a receiving module 110 that receives, from the additional compute node, a request to read from the snapshot. Example system 100 may also include a sending module 112 that sends, from the compute node to the additional compute node, metadata indicating which portion of data from the snapshot is stored on the data node and which portion of the data from the snapshot is not stored on the data node but is stored in the writeback log. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., compute node 122, compute node 208 and/or data node 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate making snapshots available. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more logs, nodes and/or snapshots, such as writeback log 122, compute node 124, and/or snapshot 126 in additional elements 120. Writeback log 122 generally represents any type or form of log that records input/output operations. In one example, writeback log 122 may record input/output operations that take place on a virtual disk and/or virtual machine. In some embodiments, writeback log 122 may be a flat file. Compute node 124 generally represents any type or form of computing device capable of hosting one or more virtual disks. The term "virtual disk," as used herein, generally refers to any software component that in any way emulates a physical storage disk. In some embodiments, compute node 124 may host one or more virtual disks used to execute virtual machines. In one embodiment, compute node 124 may be a virtual computing environment. Snapshot 126 generally represents any type or form of data that can be used to reproduce the state of a virtual disk and/or virtual machine. In some embodiments, snapshot 126 may be stored in different formats in different locations. For example, snapshot 126 may be stored in a flat file format as part of a writeback log (e.g., writeback log 122) but may be stored in a key-value format in a database on a data node.

Example system 100 in FIG. 1 may be implemented in a variety of ways. For example, all or a portion of example system 100 may represent portions of example system 200 in FIG. 2. As shown in FIG. 2, system 200 may include compute node 124 in communication with a data node 206 and/or a compute node 208 via a network 204. In one example, all or a portion of the functionality of modules 102 may be performed by compute node 124, compute node 208, and/or any other suitable computing system. As will be described in greater detail below, one or more of modules 102 from FIG. 1 may, when executed by at least one processor of compute node 124 and/or compute node 208, enable compute node 124 and/or compute node 208 to make snapshots available to other nodes.

Data node 206 generally represents any type or form of computing device that is capable of storing snapshot data. In some embodiments, data node 206 may store multiple versions of snapshots for one or more virtual machines as key-value pairs in a snapshot database. Examples of data node 206 include, without limitation, storage servers, database servers, application servers, and/or web servers configured to run certain software applications and/or provide various storage, database, and/or web services. Although illustrated as a single entity in FIG. 2, data node 206 may include and/or represent a plurality of servers that work and/or operate in conjunction with one another.

Network 204 generally represents any medium or architecture capable of facilitating communication or data transfer. In one example, network 204 may facilitate communication between compute node 124, compute node 208, and/or data node 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Metadata 210 generally represents any type or form of data that includes information about the location of other data. In some examples, metadata 210 may be a portion of an extent map that shows where data is stored on a virtual disk. Additionally or alternatively, metadata 210 may include an identifier of a compute node and/or an identifier of a snapshot. Snapshot data 212 generally represents any portion of a snapshot. In some embodiments, snapshot data 212 may represent the portion of a snapshot that is currently stored on a data node in a snapshot database. Request 214 generally represents any type of communication between two nodes. In some examples, request 214 may be a request from one compute node to read snapshot data generated by another compute node. In another example, request 214 may be a request for metadata that identifies the location or locations of snapshot data. Virtual disk creation module 216 generally represents any node or collection of nodes that is capable of creating a virtual disk. In some embodiments, virtual disk creation module may represent sub-modules located on a controller node as well as sub-modules located on a compute node.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for making snapshots available. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a writeback log that records input/output operations of a compute node within a high-availability environment. For example, identification module 104 may, as part of compute node 124 in FIG. 2, identify writeback log 122 that records input/output operations of compute node 124 within a high-availability environment.

The term "high-availability environment," as used herein, generally refers to any group of computing devices configured in such a way as to minimize downtime. In some embodiments, a high-availability environment may include a cluster of servers that host a variety of compute nodes, controller nodes, and/or data nodes.

Identification module 104 may identify the writeback log in a variety of contexts. For example, identification module 104 may identify the writeback log as part of preparations to begin creating a snapshot.

At step 304, one or more of the systems described herein may place, in the writeback log, a marker that indicates the start of a snapshot to be stored on a data node. For example, placing module 106 may, as part of compute node 124 in FIG. 2, place, in writeback log 122, a marker that indicates the start of snapshot 126 to be stored on data node 206.

The term "marker," as used herein, generally refers to any way of indicating where the data that is designated as part of a particular snapshot begins or ends in a writeback log. In some embodiments, a marker may be text inserted into the writeback log. In other embodiments, a marker may exist outside the writeback log and may point to a specific location within the writeback log.

Placing module 106 may place the marker in the writeback log in a variety of contexts. For example, placing module 106 may place the marker in the writeback log in response to a request to create a snapshot. In another example, placing module 106 may place the marker in the writeback log as part of a snapshot that is created at regular intervals (e.g., every hour).

In one embodiment, the snapshot may include a snapshot of a virtual machine. In some embodiments, the compute node may host one or more virtual machines and each virtual machine may have a writeback log that tracks input/output operations within the virtual machine. Additionally or alternatively, a writeback log may track all input/output operations on the compute node across multiple virtual machines.

At step 306, one or more of the systems described herein may mark, after placing the marker and before all data within the snapshot has been transferred to the data node, the snapshot as available to be read by an additional compute node in the high-availability environment. For example, marking module 108 may, as part of compute node 124 in FIG. 2, mark, after placing the marker and before all data within snapshot 126 has been transferred to data node 206, snapshot 126 as available to be read by compute node 208 in the high-availability environment.

Marking module 108 may mark the snapshot as available in a variety of ways. For example, marking module 108 may toggle a setting in metadata related to the snapshot to mark the snapshot as available. In another embodiment, marking module 108 may mark the snapshot as available by sending information about the snapshot to another node. In some embodiments, marking module 108 may display the snapshot's status in a user interface as "available." Additionally or alternatively, marking module 108 may add the snapshot to a list of available snapshots. In some embodiments, marking module 108 may update metadata for the snapshot with an identifier of the compute node and/or an identifier for the snapshotted virtual disk. In one embodiment, a controller node may store this metadata.

In some embodiments, marking module 108 may mark the snapshot as available immediately after placing module 106 has placed the marker. That is, the systems described herein may mark the snapshot as available within several seconds or milliseconds of placing the marker and/or may mark the snapshot as available without executing any other action in between placing the marker and marking the snapshot as available.

In some embodiments, compute nodes may be capable of hosting more than one virtual disk. In these embodiments, the additional compute node may be the compute node, which may be requesting the snapshot in order to use the snapshot data to create a new virtual disk. In some embodiments, a compute node may be referred to as a "host." In these embodiments, the compute node may be described as the source host and the additional compute node may be described as the target host. In some examples, the source host for the snapshot may be the same as the target host.

At step 308, one or more of the systems described herein may receive, from the additional compute node, a request to read from the snapshot. For example, receiving module 110 may, as part of compute node 124 in FIG. 2, receive, from compute node 208, request 214 to read from snapshot 126.

Receiving module 110 may receive the request in a variety of contexts. For example, receiving module 110 may receive the request directly from the additional compute node. In other embodiments, receiving module 110 may receive the request from a controller node that received the request from the additional compute node. In some embodiments, the request to read from the snapshot may be triggered by a user attempting to create a new virtual disk. In other embodiments, the request may be triggered by an automatic process, for example in order to scale a cluster of virtual machines by providing more redundant virtual machines and/or in order to restore a damaged virtual machine from a backup.

At step 310, one or more of the systems described herein may send, from the compute node to the additional compute node, metadata indicating which portion of data from the snapshot is stored on the data node and which portion of the data from the snapshot is not stored on the data node but is stored in the writeback log. For example, sending module 112 may, as part of compute node 124 in FIG. 2, send, from compute node 124 to compute node 208, metadata indicating which portion of data from snapshot 126 is stored on data node 206 and which portion of the data from snapshot 126 is not stored on data node 206 but is stored in writeback log 122.

Sending module 112 may send the metadata in a variety of contexts. For example, sending module 112 may send the metadata directly to the additional compute node. In another embodiment, sending module 112 may send the metadata to a controller node which may forward the metadata to the additional compute node.

In one embodiment, systems described herein may receive, at the compute node, a read request for data within the portion of the data from the snapshot that is not stored on the data node but is stored in the writeback log and send, from the compute node to the additional compute node, the data requested by the read request that is stored in the writeback log. In some embodiments, if the additional compute node only needs to make read requests and not write requests in relation to the data in the snapshot, the additional compute node may not create a new copy of the data but may read the snapshot from the compute node and/or data node.

In one example, systems described herein may transfer, from the compute node to the additional compute node, the portion of the data from the snapshot that is not stored on the data node but is stored in the writeback log. For example, if the additional compute node needs to make write requests to the snapshot data, the additional compute node may create a new copy of the data in the snapshot. In one embodiment, the additional compute node may synthesize this new copy from the data stored in the writeback log and the data stored on the data node. For example, as illustrated in FIG. 4, compute node 402 may attempt to create a local copy of snapshot 410. In some examples, compute node 402 may do this by copying snapshot data 408 from data node 406. In one example, snapshot data 408 may not include the complete snapshot. In this example, compute node 402 may also copy snapshot data 412 from snapshot 126 in writeback log 122 on compute node 124. In this example, compute node 402 may then combine snapshot data 408 with snapshot data 412 to arrive at a complete copy of snapshot 410. In some embodiments, the systems described herein may have to process some or all of the data to arrive at a complete snapshot. For example, if data in the writeback log is stored as a flat file and data on the data node is stored as key-value pairs, the systems described herein may have to normalize the data in order to synthesize the snapshot.

In one embodiment, systems described herein may (i) issue, by a controller node, a virtual disk creation command to create a virtual disk hosted by the additional compute node, (ii) receive, by the controller node, a unique identifier of the snapshot, an identifier of the compute node, and an identifier of the additional compute node, (iii) request, by the additional compute node, the metadata from the compute node, (iv) receive, by the additional compute node, the metadata from the compute node, (v) update, by the additional compute node, an extent map for the virtual disk that, for each portion of data from the snapshot, stores a location of the portion of data, and (vi) mark, in response to the additional compute node updating the extent map, the virtual disk creation command as completed. In some examples, the systems described herein may perform some actions on a compute node, some actions on an additional compute node, and/or some actions on a controller node.

Figure 5:
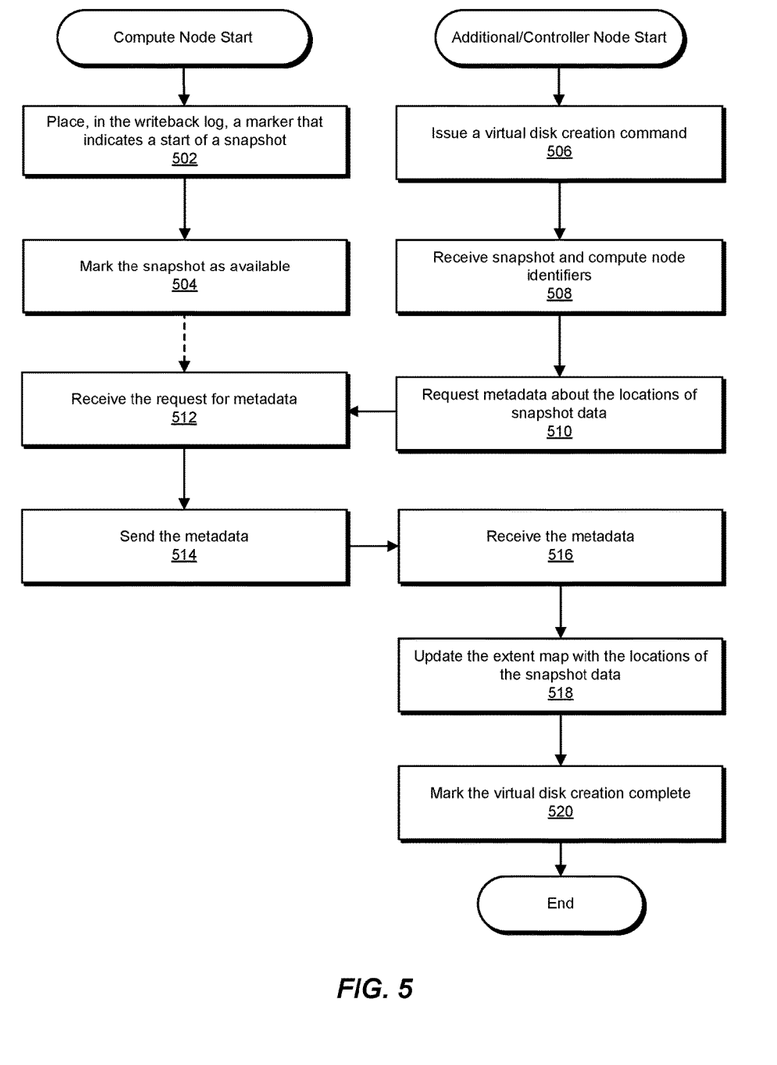
FIG. 5 is a flow diagram of an example method for making snapshots available.

For example, as illustrated in FIG. 5, at step 502, the compute node may place, in the writeback log, a marker that indicates the start of a snapshot. Immediately thereafter, at step 504, the compute node may mark the snapshot as available. Immediately thereafter or at some later time, at step 506, a controller node may issue a virtual disk creation command for an additional compute node. Next, at step 508, the controller node may receive, from the compute node and/or the additional node, an identifier of the compute node, an identifier of the additional node, and/or a unique identifier (e.g., a global unique identifier [GUID]) of the snapshot. At step 510, the additional compute and/or the controller node (on behalf of the additional compute node) node may request metadata about the locations (e.g., in the writeback log and/or on the data node) of the snapshot data. At step 512, the compute node may receive the request for the metadata and at step 514 the compute node may send the metadata to the additional compute node and/or the controller node. At step 516, the additional compute node and/or the controller node may receive the metadata. In some embodiments, the additional compute node and/or controller node may also query the data node about the snapshot data and/or the location of the snapshot data. Next, at step 518, the additional compute node may update the extent map with the locations of the snapshot data, enabling the additional compute node to read from the snapshot. If the additional compute node is only intending to make read requests from the snapshot at step 520, the additional node and/or the controller node may mark the virtual disk creation operation as complete. If the additional compute node intends to write to the snapshot data, the additional compute node may transfer the snapshot data from the compute node and/or the data node.

In one embodiment, systems described herein may detect that all of the data from the snapshot is now stored on the data node and then delete the writeback log. In some embodiments, the systems described herein may periodically expire writeback logs (e.g., every few days, or every 1 MB of log data) and may delete any writeback log that is both expired and not being currently used as a source of snapshot data. In some embodiments, an additional compute node and/or a controller node that is seeking snapshot data may first query the compute node to determine whether the data is in the writeback log. If the relevant writeback log has been deleted, the additional compute node and/or controller node may then query a data node to find the snapshot data.

As explained in connection with FIGS. 1-5 above, the systems and methods described herein may improve the speed of snapshot availability by enabling nodes to read snapshot data directly from a writeback log in the compute plane instead of waiting for the snapshot data to be transferred to a data node in the data plane, a process that may be slow and time-consuming. Making the snapshot instantly available may speed up provisioning, for example by enabling applications to create duplicate virtual machines based on the snapshot in order to provide additional and/or redundant functionality. Additionally, the systems and methods described herein may enable further efficiency improvements by enabling nodes to make read requests directly to the writeback log rather than creating new copies of snapshot data. Time and efficiency improvements of this nature are helpful in ensuring that a high-availability environment maintains the highest possible uptime.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for making snapshots available, at least a portion of the method being performed by a computing device comprising at least one processor, the method comprising:
    identifying a writeback log that records input/output operations of a compute node within a high-availability environment;
    placing, in the writeback log, a marker that indicates a start of a snapshot to be stored on a data node;
    marking, after placing the marker and before all data within the snapshot has been transferred to the data node, the snapshot as available to be read by an additional compute node in the high-availability environment;
    receiving, from the additional compute node, a request to read from the snapshot;
    sending, from the compute node to the additional compute node, metadata indicating which portion of data from the snapshot is stored on the data node and which portion of the data from the snapshot is not stored on the data node but is stored in the writeback log;
    issuing, by a controller node, a virtual disk creation command to create a virtual disk hosted by the additional compute node;
    receiving, by the controller node, a unique identifier of the snapshot, an identifier of the compute node, and an identifier of the additional compute node;
    requesting, by the additional compute node, the metadata from the compute node;
    receiving, by the additional compute node, the metadata from the compute node;
    updating, by the additional compute node, an extent map for the virtual disk that, for each portion of data from the snapshot, stores a location of the portion of data; and
    marking, in response to the additional compute node updating the extent map, the virtual disk creation command as completed.

2. The computer-implemented method of claim 1, further comprising:
    receiving, at the compute node, a read request for data within the portion of the data from the snapshot that is not stored on the data node but is stored in the writeback log; and
    sending, from the compute node to the additional compute node, the data requested by the read request that is stored in the writeback log.

3. The computer-implemented method of claim 1, further comprising transferring, from the compute node to the additional compute node, the portion of the data from the snapshot that is not stored on the data node but is stored in the writeback log.

4. The computer-implemented method of claim 1, wherein the snapshot comprises a snapshot of a virtual machine.

5. The computer-implemented method of claim 1, further comprising:
    detecting that all of the data from the snapshot is now stored on the data node; and
    deleting the writeback log.

6. The computer-implemented method of claim 1, wherein the additional compute node comprises the compute node.

7. A system for making snapshots available, the system comprising:

an identification module, stored in memory, that identifies a writeback log that records input/output operations of a compute node within a high-availability environment;

a placing module, stored in memory, that places, in the writeback log, a marker that indicates a start of a snapshot to be stored on a data node;

a marking module, stored in memory, that marks, after placing the marker and before all data within the snapshot has been transferred to the data node, the snapshot as available to be read by an additional compute node in the high-availability environment;

a receiving module, stored in memory, that receives, from the additional compute node, a request to read from the snapshot;

a sending module, stored in memory, that sends, from the compute node to the additional compute node, metadata indicating which portion of data from the snapshot is stored on the data node and which portion of the data from the snapshot is not stored on the data node but is stored in the writeback log;

a virtual disk creation module, stored in memory, that:
 issues, by a controller node, a virtual disk creation command to create a virtual disk hosted by the additional compute node;
 receives, by the controller node, a unique identifier of the snapshot, an identifier of the compute node, and an identifier of the additional compute node;
 requests, by the additional compute node, the metadata from the compute node; receives, by the additional compute node, the metadata from the compute node;
 updates, by the additional compute node, an extent map for the virtual disk that, for each portion of data from the snapshot, stores a location of the portion of data; and
 marks, in response to the additional compute node updating the extent map, the virtual disk creation command as completed; and at least one physical processor configured to execute the identification module, the placing module, the marking module, the receiving module, and the sending module.

8. The system of claim 7, further comprising:
the receiving module receives, at the compute node, a read request for data within the portion of the data from the snapshot that is not stored on the data node but is stored in the writeback log; and
the sending module sends, from the compute node to the additional compute node, the data requested by the read request that is stored in the writeback log.

9. The system of claim 7, wherein the sending module transfers, from the compute node to the additional compute node, the portion of the data from the snapshot that is not stored on the data node but is stored in the writeback log.

10. The system of claim 7, wherein the snapshot comprises a snapshot of a virtual machine.

11. The system of claim 7, wherein the marking module: detects that all of the data from the snapshot is now stored on the data node; and
deletes the writeback log.

12. The system of claim 7, wherein the additional compute node comprises the compute node.

13. A non-transitory computer-readable medium comprising one or more computer-readable instructions that, when executed by at least one processor of a computing device, cause the computing device to:
 identify a writeback log that records input/output operations of a compute node within a high-availability environment;
 place, in the writeback log, a marker that indicates a start of a snapshot to be stored on a data node;
 mark, after placing the marker and before all data within the snapshot has been transferred to the data node, the snapshot as available to be read by an additional compute node in the high-availability environment;
 receive, from the additional compute node, a request to read from the snapshot;
 send, from the compute node to the additional compute node, metadata indicating which portion of data from the snapshot is stored on the data node and which portion of the data from the snapshot is not stored on the data node but is stored in the writeback log;
 issue, by a controller node, a virtual disk creation command to create a virtual disk hosted by the additional compute node;
 receive, by the controller node, a unique identifier of the snapshot, an identifier of the compute node, and an identifier of the additional compute node;
 request, by the additional compute node, the metadata from the compute node;
 receive, by the additional compute node, the metadata from the compute node;
 update, by the additional compute node, an extent map for the virtual disk that, for each portion of data from the snapshot, stores a location of the portion of data; and
 mark, in response to the additional compute node updating the extent map, the virtual disk creation command as completed.

14. The non-transitory computer-readable medium of claim 13, wherein the one or more computer-readable instructions cause the computing device to:
 receive, at the compute node, a read request for data within the portion of the data from the snapshot that is not stored on the data node but is stored in the writeback log; and
 send, from the compute node to the additional compute node, the data requested by the read request that is stored in the writeback log.

15. The non-transitory computer-readable medium of claim 13, wherein the one or more computer-readable instructions cause the computing device to transfer, from the compute node to the additional compute node, the portion of the data from the snapshot that is not stored on the data node but is stored in the writeback log.

16. The non-transitory computer-readable medium of claim 13, wherein the snapshot comprises a snapshot of a virtual machine.

17. The non-transitory computer-readable medium of claim 13, wherein the one or more computer-readable instructions cause the computing device to:
 detect that all of the data from the snapshot is now stored on the data node; and
 delete the writeback log.

* * * * *